F. M. LECHNER.
Hose-Coupling.

No. 227,170. Patented May 4, 1880.

Witnesses:
H. N. Low
H. H. Bliss

Inventor:
Frances M. Lechner
by H. H. Doubleday, atty

UNITED STATES PATENT OFFICE.

FRANCIS M. LECHNER, OF WAYNESBURG, ASSIGNOR OF ONE-HALF OF HIS RIGHT TO THADDEUS LONGSTRETH, OF COLUMBUS, OHIO.

HOSE-COUPLING.

SPECIFICATION forming part of Letters Patent No. 227,170, dated May 4, 1880.

Application filed February 24, 1880.

*To all whom it may concern:*

Be it known that I, FRANCIS M. LECHNER, of Waynesburg, in the county of Stark and State of Ohio, have invented certain new and useful Improvements in Hose-Couplings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 3:
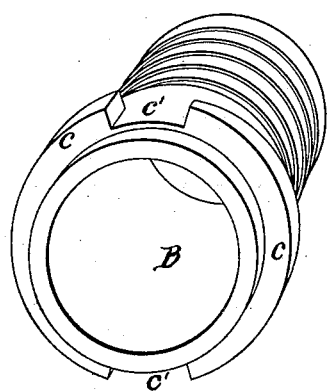
Figure 2:
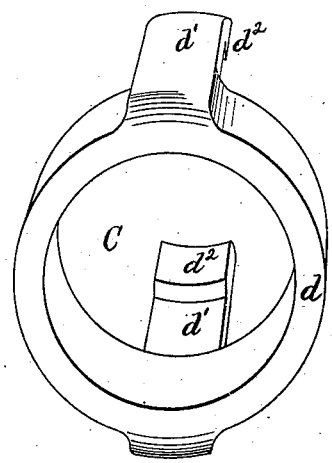
Figure 4:
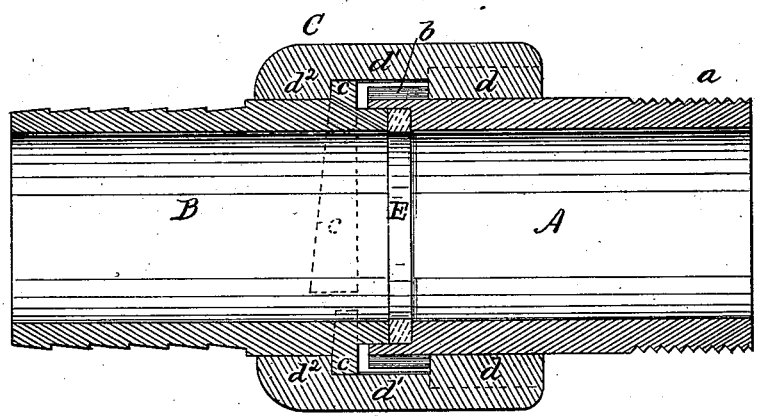
Figure 1:
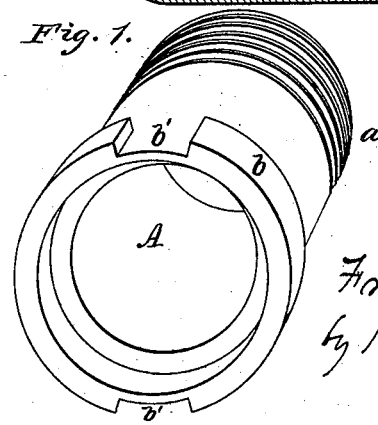

Figure 1 is a perspective view of the female part of the coupling. Fig. 2 is a perspective of the connecting part, and Fig. 3 is a perspective of the male part. Fig. 4 is a longitudinal section of the coupling when the parts are secured together.

A represents the female part of the coupling, it being screw-threaded or otherwise adapted to retain the end of the hose at $a$. At the inner end it has a flange, $b$, in which are formed small recesses or ways $b'$ $b'$.

B represents the male part of the coupling, which is of the same diameter as the part A. At its inner end it is provided with two inclined flanges or ribs, $c$ $c$, between which there are passage-ways or recesses $c'$ $c'$, formed corresponding to the recesses $b'$ $b'$ on the part A.

The connecting part is represented by C. It consists of a ring, $d$, adapted to slip over the thinner portion of the part A and to engage with the flange $b$.

$d'$ $d'$ are arms projecting from the ring, and they are formed with inwardly-turned ears or lugs $d^2$ $d^2$, arranged to engage with the flanges or ribs $c$ $c$ on the part B.

By forming the ring C and the projecting parts $d'$ $d^2$ in a piece separate from the part A, I am enabled to turn and finish said part far more conveniently and perfectly than could be done were the parts all cast in one piece, it being necessary to have the adjoining ends of the parts of coupling perfectly true.

Should the connecting part C be broken or otherwise impaired, it can be removed and replaced by another without causing the loss of the whole of the male part of the coupling, as is the case when cast together.

It is of advantage to have the outer diameter of the flange $b$ the same, or nearly the same, as that of the ribs $c$ $c$, and therefore in order to slip the connecting part C over the parts A and B it is necessary to provide passage-ways for the ears $d^2$ $d^2$ through the flanges $b$ and $c$.

E represents a packing, of rubber or other suitable material, placed in a seat in the inner end of the part A.

The coupling is arranged for use by first slipping the part C over the part A, and the end of the hose is then secured at $a$. After the hose is in place it is impossible to lose or misplace the part C without removing the hose.

When the arms $d'$ $d'$ project beyond the end of part A the part B is coupled thereto in a manner that will be readily understood from the drawings.

Neither part of the hose need be twisted in coupling or uncoupling, as the part C moves independently of the others.

Another important advantage growing out of my invention is the economy of material and labor secured in the manufacture. Thus it will be seen that, with the exception of the inclined faces of the ribs $c$ $c$ and the corresponding inclined faces of the lugs $d^2$ $d^2$, all of the parts can be finished by turning either in a lathe or a chuck, none of the surfaces being broken by projecting ribs in such manner as to interfere with conveniently turning them, while at the same time the amount of metal employed in the fastening device is much less than that used in any prior construction of which I have knowledge.

I am aware that hose-couplings have been known heretofore having arms projecting from one of the parts, and locking-lugs formed upon said arms, arranged to engage with another part of the coupling, and also that couplings have been made in three parts locked together by means of inclined ribs or flanges and lugs arranged to engage therewith, and I do not claim, broadly, such construction.

What I claim is—

In combination with the part A, having the flange $b$, recessed at $b'\ b'$, and the part B, to which the hose is attached, and which is cast with the inclined ribs $c\ c$, recessed at $c'\ c'$, the part C, formed separately, and having arms $d'\ d'$, and the inwardly-turned ears $d^2$, arranged to pass through the recesses $b'\ b'$ and to engage directly with the hose-carrying part B, substantially as set forth.

I testimony that I claim the foregoing I have hereunto set my hand this 19th day of February, 1880.

FRANCIS M. LECHNER.

Witnesses:
THOMAS C. ORNDORFF,
J. W. NEEREAMER.